(12) United States Patent
König et al.

(10) Patent No.: US 6,644,268 B2
(45) Date of Patent: Nov. 11, 2003

(54) METHOD FOR THE INJECTION OF FUEL

(75) Inventors: Gerhard König, Lauterstein (DE); Heinz Öing, Dörpen (DE); Gregor Renner, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 204 days.

(21) Appl. No.: 09/991,564

(22) Filed: Nov. 16, 2001

(65) Prior Publication Data

US 2002/0083920 A1 Jul. 4, 2002

Related U.S. Application Data

(63) Continuation-in-part of application No. PCT/EP00/04087, filed on May 6, 2000.

(30) Foreign Application Priority Data

May 19, 1999 (DE) .......................................... 199 22 964

(51) Int. Cl.$^7$ ................................................. F02B 3/00
(52) U.S. Cl. ...................................... 123/299; 123/276
(58) Field of Search ................................. 123/299, 276, 123/279, 295, 300, 361, 398

(56) References Cited

U.S. PATENT DOCUMENTS

| | | | | |
|---|---|---|---|---|
| 1,498,273 A | * | 6/1924 | Hesselman | 123/276 |
| 1,988,754 A | * | 1/1935 | Sleffel | 123/260 |
| 4,195,783 A | | 4/1980 | Hulsing | |
| 4,548,172 A | * | 10/1985 | Bailey | 123/298 |
| 4,748,949 A | * | 6/1988 | Steiger et al. | 123/299 |
| 6,553,960 B1 | * | 4/2003 | Yoshikawa et al. | 123/299 |

FOREIGN PATENT DOCUMENTS

| | | |
|---|---|---|
| CH | 686 635 | 5/1996 |
| DE | 28 37 606 | 3/1980 |
| DE | 85 21 912 | 1/1987 |
| DE | 691 01 739 | 4/1994 |
| DE | 43 40 883 | 6/1995 |
| DE | 44 42 764 | 6/1996 |
| DE | 196 06 087 | 8/1996 |
| DE | 197 07 811 | 9/1998 |
| DE | 197 16 226 | 10/1998 |
| DE | 198 15 266 | 10/1998 |
| GB | 1 521 065 | 8/1978 |
| GB | 2 113 303 | 1/1982 |
| WO | WO 97/48900 | 12/1997 |

* cited by examiner

Primary Examiner—Mahmoud Gimie
(74) Attorney, Agent, or Firm—Klaus J. Bach

(57) ABSTRACT

In a method for the injection of Diesel fuel into a combustion chamber of a Diesel engine by way of a fuel injection valve with a plurality of pilot and main fuel injection ports, the fuel is injected during partial load operation only by way of the pilot injection ports such that a homogeneous mixture is formed and, under full load operation, fuel is additionally injected—after a pause—through the main fuel injection ports in such a way that a fuel jet bundle is formed in combination with the fuel jets formed by the pilot ports which is extends over the whole periphery of the combustion chamber. The fuel injection valve has the main fuel ports arranged in a piezo-actuated tappet in series in the direction of the opening movement of the tappet behind the associated pilot ports. With the piezo drive the opening stroke of the tappet can be controlled so as to provide fuel injection pauses between the pilot fuel injection and the main fuel injection.

11 Claims, 3 Drawing Sheets

METHOD FOR THE INJECTION OF FUEL

This is a continuation-in-part application of international application PCT/EP00/04087 filed May 6, 2000 and claiming the priority of German application 199 22 964.3 filed May 6, 1999.

BACKGROUND OF THE INVENTION

The invention relates to a method for the injection of fuel into the combustion chamber of an internal combustion engine, especially for the injection of diesel fuel, and to an injection valve for performing the method.

DE 196 06 087 A1 describes a fuel injector, which has a plurality of primary injection ports and a plurality of secondary injection ports in an outwardly-opening valve tappet. The object of is fuel injector is to improve the efficiency of the fuel combustion when the engine is operating at high speed.

Similar injection valves are disclosed by DE 44 42 764 A1 and GB 2 113 303 A. DE 43 40 883 A1 likewise describes a fuel injector having an outwardly-opening valve tappet, with a valve head in which two or more parallel passages are arranged for the injection of fuel. The passages are separated from one another by a dividing wall and are successively opened during the opening stroke by a control edge on the valve head. The object of this arrangement is to maintain the spray direction in conventional diesel injection procedures, that is to say in the main combustion phase, irrespective of whether one or both passages are opened.

GB-A-1 521 065 describes a method for the injection of fuel into the combustion chamber of an internal combustion engine and an injection valve. The injection valve has two rows of injection ports, which are arranged in series and are designed to generate turbulence in the combustion chamber by rotation of the valve tappet in all load ranges.

Normally in a diesel engine, air is first compressed and then fuel is injected into the compressed, hot air where the fuel is instantly ignited. Additional fuel is then injected into the already burning fuel-air mixture. The mixture formation is essentially achieved in that the fuel jets injected under high impulse strike the wall of a recess formed in the piston and are there deflected, thereby creating a strong turbulence effect. In practice, very efficient mixing and hence mixture formation are thereby achieved during normal combustion.

This method functions relatively well at most operating points, especially in the operating mode for which the engine is optimally designed. It is virtually impossible to guarantee optimum mixing of fuel and oxygen, however, so that there is a risk that over-rich fuel zones are formed whereby increased amounts of soot are generated, or that virtually stoichiometrically mixed zones are formed in which very high combustion temperatures occur and thermal nitrogen oxide formation is increased.

It is the object of the present invention therefore to improve a method of the type as described in the introductory part in such a way that an improved mixture formation and hence good efficiency in all load ranges of the engine is achieved without increases in emissions. Another object of the invention is to create an injection valve for performing the method according to the invention.

SUMMARY OF THE INVENTION

In a method for the injection of Diesel fuel into a combustion chamber of a Diesel engine by way of a fuel injection valve with a plurality of pilot and main fuel injection ports, the fuel is injected during partial load operation only by way of the pilot injection ports such that a homogeneous mixture is formed and, under full load operation, fuel is additionally injected, preferably after a pause, through the main fuel injection ports in such a way that a fuel jet bundle is formed in combination with the fuel jets formed by the pilot ports which is extends over the whole periphery of the combustion chamber. The fuel injection valve has the main fuel ports arranged in a piezo-actuated tappet in series in the direction of the opening movement of the tappet behind the associated pilot ports.

With the method according to the invention, pre-homogenization and hence an extremely uniform fuel preparation are provided for already prior to the initiation of compression ignition. The pre-homogenization is achieved by injecting fuel through pilot injection ports to form pilot injection jets. The pilot injection jets are distributed around the periphery of the combustion chamber in such a way that thorough mixing of the fuel with the air present in the combustion chamber occurs at a point in time when the pressure and temperature of the compressed air have not yet reached a sufficiently high level for the onset of rapid ignition. This means that there is sufficient time for fuel atomization.

If the engine is operated at partial load, the injected fuel quantity, which, for this pre-homogenization may amount for example to as much as 50% of the total injection amount, is sufficient to achieve subsequent compression ignition with an engine power output sufficient for partial load operation.

The prior intensive mixing of air and fuel prevents soot formation during compression ignition, since there are no overly rich fuel zones present. The mixture preparation according to the invention also allows the mixture to be leaner, so that only minimal nitrogen oxide formation occurs. At the same time engine efficiency is improved and/or the fuel consumption is reduced.

However, the method according to the invention also functions under near full load operating conditions and during full load operation.

In this case for the pilot injection, which occurs in particular 100° before the top dead center position of the associated piston to approximately 30° before the top dead center positions, a uniform mixture preparation is provided. In order to then reach the upper partial load range or even full load range, the homogeneous fuel preparation according to the invention formed in the partial load range must be combined with the known conventional injection strategy, since, what matters here, is a high jet impulse, intensive jet-wall interaction and an optimum air utilization and turbulent mixing.

According to the invention, this is now achieved in that, under full load or nearly full load operating condition, the main jets discharge through the main injection ports distributed around the periphery are also activated. It is important here that the pilot injection jets and the main jets together produce common jet bundles, which with the injector fully opened behave like individual jets from large injection ports.

In a particular embodiment of the invention, this is achieved in that the pilot injection ports, which generate the pilot injection jets, are so arranged with regard to their orientations and the injection angle that the main jet emerging from a main injection port incorporates the respective associated pilot injection jets.

The inventors surprisingly found that, with a corresponding arrangement of the injection ports and coordination of the diameter ratios, wherein the main injection ports have distinctly larger diameters than the pilot injection ports, the main jets, owing to their higher impulse and the resulting higher penetration velocity, produce a suction effect, by means of which the respective pilot injection jets are sucked in and thereby combined with the respective main jet to form a common jet, resulting in uniform jet bundles distributed over the periphery.

The diameter ratios between main injection ports and pilot injection ports may be between 2:1 and 6:1. Other values are obviously still possible, and are within the scope of the invention.

When main injection is required for full load operation, one or more injection pauses are advantageously provided between the pilot fuel injection and the main fuel injection, which further enhance the homogenous mixing.

In a very advantageous embodiment, this method can be performed by an injection valve, which allows an outwardly-opening valve tappet to briefly perform a counter-movement during the injection phase, which briefly closes the pilot injection ports in order to provide for the desired injection pause. It has also been found that an injection valve, in which a piezo-ceramic actuating device is provided for the movement of the valve tappet, is particularly suitable herefor. In contrast to a pressure-controlled system, in which such precise positioning is not possible, a piezo-ceramic actuating device also allows intermediate positions to be assumed by the valve tappet.

The invention will become more readily apparent from the following description of an embodiment thereof, shown, by way of example only, in the accompanying drawings.

DESCRIPTION OF A PARTICULAR EMBODIMENT

Figure 1:
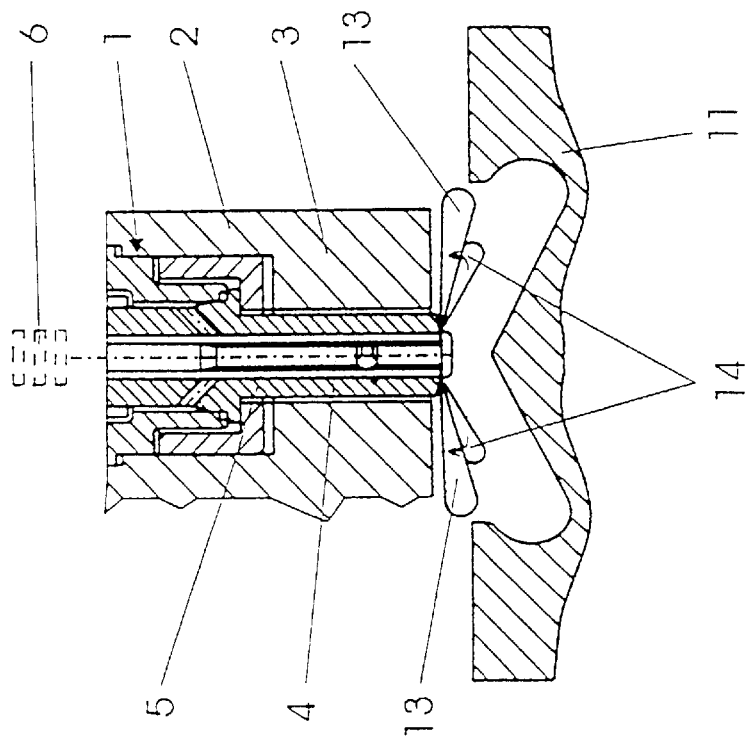
FIG. 1 shows the lower part of an injection valve in partial load configuration.
Figure 2:
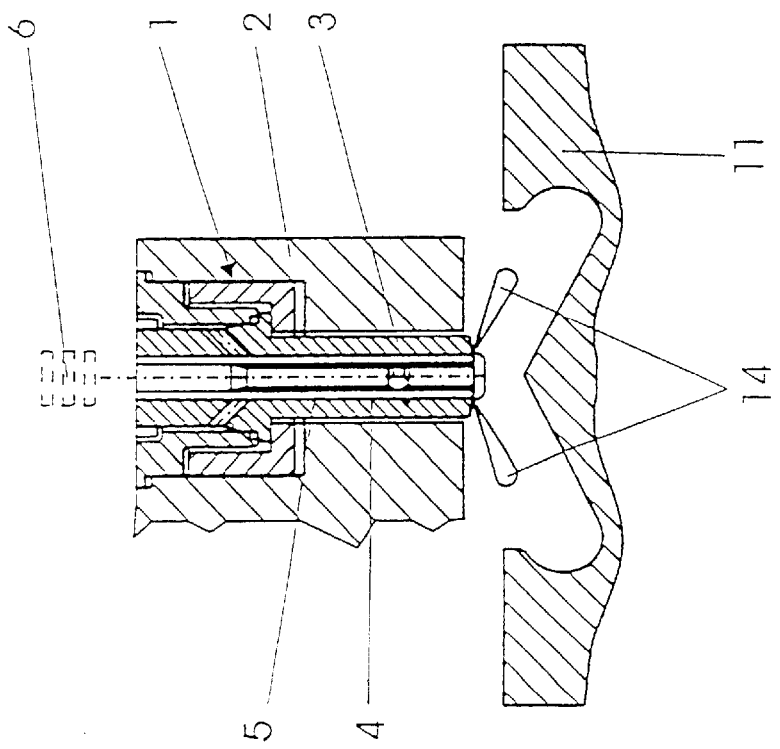
FIG. 2 shows the lower part of the injection valve according to FIG. 1 in full load configuration.

The basic design and the operating principle of an injection valve 1 are generally known. For this reason only the lower area of such a valve is shown in order to explain the invention. The injection valve 1 is arranged in a valve housing 2. A valve tappet 4, also known as valve needle, enclosed by a valve stem 3, is arranged inside the injection valve 1. Between the valve stem 3 and the valve tappet 4 is an annular space 5, via which fuel is delivered under pressure.

The valve tappet 4 is actuated to move outwardly in a valve opening direction and inwardly in the valve closing direction by a piezo-ceramic actuating device 6 in the form of a piezo-stack element, which is merely indicated by dashed lines. The functioning and operating principle of the piezo-ceramic actuating device 6, which is based on a variation in the length of the piezo-stack when a current is applied, are generally known.

Figure 3:
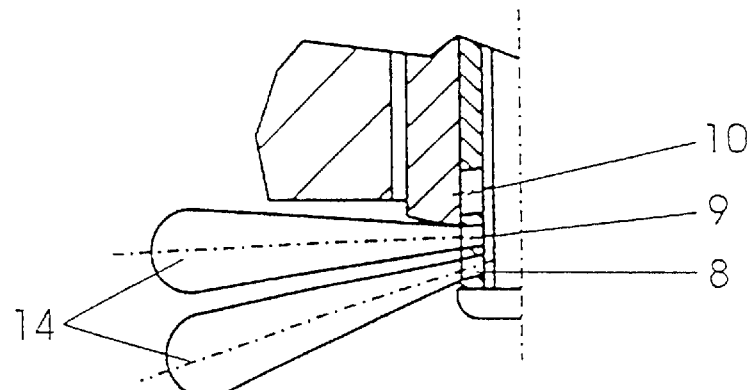
FIG. 3 is an enlarged representation of the lower area of the injection valve with injection ports during partial load operation.
Figure 4:
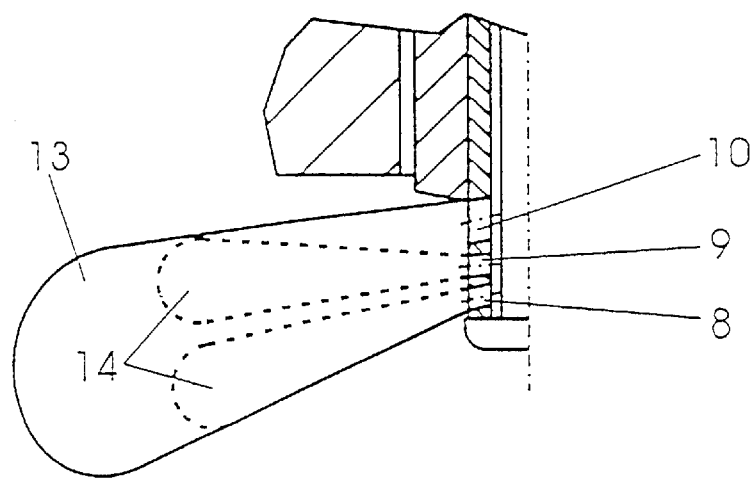
FIG. 4 is an enlarged representation of the lower area of the injection valve with injection ports during full load operation.
Figure 5:
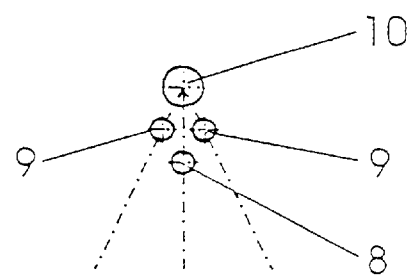
FIG. 5 shows the arrangement of a main injection port in relation to three pilot injection ports, which form one unit.

From the enlarged representations in FIGS. 3, 4 and 5 it will be seen that the valve tappet 4 is provided, at its end projecting into the combustion chamber 7, with a plurality of small pilot injection ports 8 and 9 distributed over the periphery. The pilot injection ports 8 form a bottom row, whilst the pilot injection ports 9 form an upper row. The longitudinal axes of the injection ducts forming the pilot injection ports 8 and 9 are inclined at different angles with respect to the longitudinal axis of the valve.

Main injection ports 10, likewise distributed over the periphery, are arranged above the row of pilot injection ports 9.

It can be seen from FIG. 5 that three pilot injection ports, that is two pilot injection ports 9 in the upper row and one pilot injection port 8 in the lower row, are assigned to each main injection port 10. This number and assignment is chosen merely as an example; if appropriate just two pilot injection ports may be assigned to each main injection port 10. Of course, also more pilot injection ports 8 and 9 can be provided for each main injection port 10. This depends in each case on the local factors and the size of the combustion chamber 7 and of the associated piston 11 and cylinder 12.

The ratios between the diameters of the main injection port 10 and the pilot injection ports 8 and 9 are preferably from 2:1 to 6:1. Here too, other values are obviously also possible, where necessary. It is only essential that in such an arrangement fuel is injected via the main injection port 10 with an impulse such that a main jet 13 is generated, which exerts a suction effect on the pilot injection jets 14 produced by the injection ports 8 and 9.

The pilot injection jets 14 can are clearly shown in FIG. 1 and also in FIG. 3.

FIG. 4 shows how the pilot injection jets 14, partially deflected by the suction effect exerted by the stronger main jet 13, are incorporated in the main jet 13, thereby resulting in jet bundles distributed uniformly over the periphery and hence over the combustion chamber 7.

Figure 6:
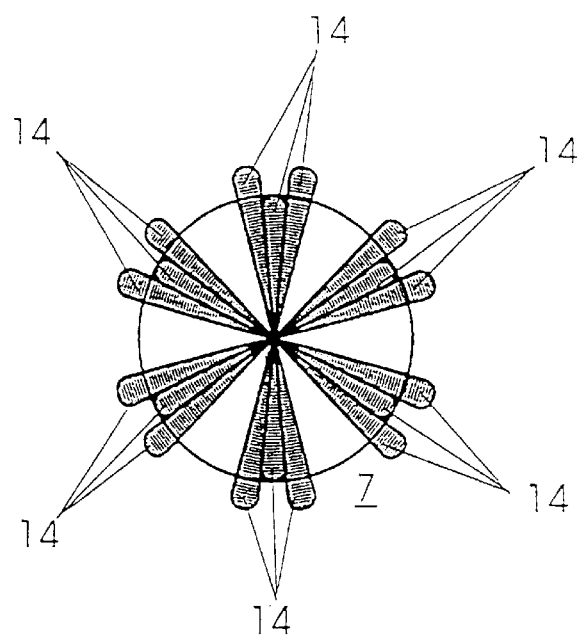
FIG. 6 shows a schematic diagram of the distribution of pilot injection jets in a combustion chamber viewed from above.

FIG. 6 is a top view of the distribution pattern of the pilot injection jets 14 in the combustion chamber 7. The injection for the (pre)homogenization occurs during the compression stroke of the piston 11, that is either exclusively in the (lower) partial load range or in combination with a main injection via the main injection port 10 in the other load ranges.

Figure 7:
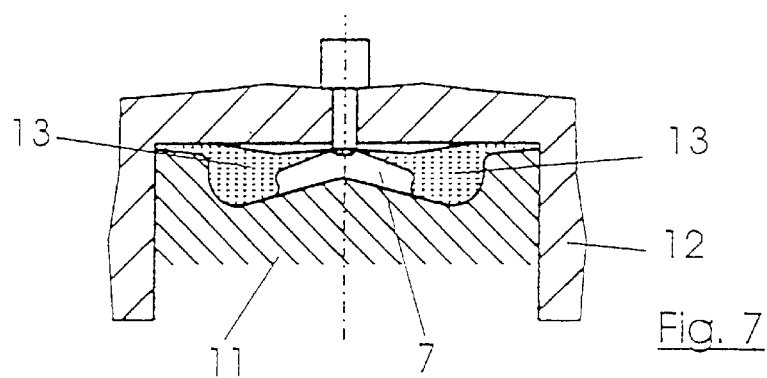
FIG. 7 is a side view of the jet bundle formed during upper partial load and full load operation.
Figure 8:
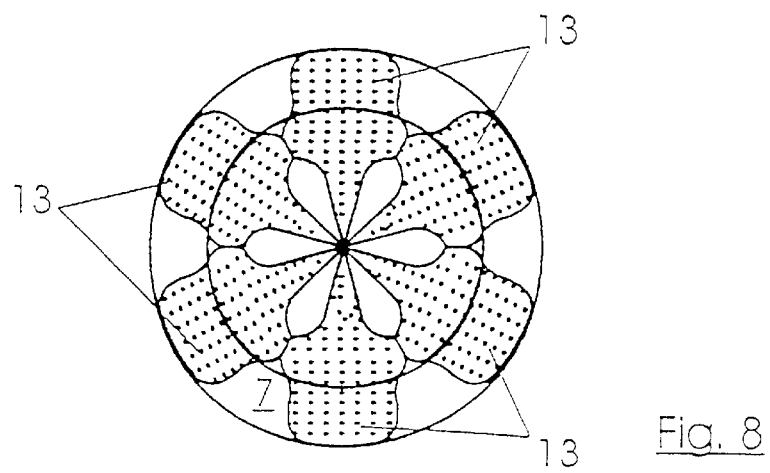
FIG. 8 is a top view of the jet bundle shown in FIG. 7.

FIGS. 7 and 8 show the distribution pattern of the jet bundles formed by the main jets 13 in the combustion chamber 7; the pilot injection jets 14 are incorporated in the respective main jets 13. As can be seen, an intensive jet-wall interaction is achieved in the upper partial load range and in the full load range, which corresponds to the conventional fuel injection method. The main injection via the main injection ports 10 can in this case usually take place at least approximately 15° before the top dead center position of the associated piston 11 to approximately 20° after the top dead center position.

In order that very effective pre-homogenization may also be achieved in the upper partial load range and in the full load range, the injection valve 1 is controlled by the piezo-ceramic actuating device 6, in such a way that, after one or more pilot injection phases, which can occur in a range from approximately 100° to 30° before the piston reaches the top dead center position, one or more movements of the valve stem if in opposite direction, that is closing movements, are briefly performed by the valve tappet 4, such that the pilot injection ports 8 and 9 are shortly closed again. This means that one or more injection pauses is/are interposed before the main injection port is opened at 15° before the top dead center position of the associated piston 11 by a renewed opening movement of the valve tappet 4. This opening stroke is large enough to expose both the pilot injection ports 8 and 9 and the main injection ports 10.

It will furthermore be seen from FIG. 4 that the injection direction of each main injection port 10 is chosen such that the fuel emitted therefrom is directed into the area between the associated pilot injection ports 8 and 9 and the respective pilot injection jets 14. The main fuel injection jet is relatively strong so that it incorporates the pilot injection jets in order to form a common main jet or jet bundles jointly distributed over the periphery.

What is claimed is:

1. A method for the injection of Diesel fuel into a combustion chamber of an internal combustion engine by way of an injection valve including a valve tappet, such that a plurality of pilot and main fuel injection ports arranged one above, another and in series in the direction of opening movement of the valve tappet, said method comprising the steps of:

injecting, in a partial load range, pilot injection jets through said pilot injection ports in various injection directions and angles in relation to the longitudinal axis of valve into the combustion chamber prior to the initiation of compression ignition such that an essentially homogeneous mixture of air and fuel is produced in said combustion chamber and, during full load and close to full load operations, injecting fuel into the combustion chamber additionally through the main injection ports to form main jets distributed over the periphery in such a way that each main jet encompasses at least one pilot injection jet so as to largely incorporate said pilot jet into the respective associated main fuel jet thereby forming a common fuel jet, and providing for fuel jet bundle which are distributed over the periphery of the combustion chamber of the internal combustion engine.

2. A method according to claim 1, wherein at least one injection pause is interposed between the pilot fuel injection and the main fuel injection.

3. A method according to claim 1, wherein the pilot fuel injection takes place in at least two phases, between each of which an injection pause is interposed.

4. A method according to claim 2, wherein the pilot fuel injection by way of the pilot injection ports takes place over a range of 100° to 30° before the top dead center position of the piston assigned to the respective combustion chamber.

5. A method according to claim 1, wherein the main fuel injection takes place between 15° before the top dead center piston position and 20° after the top dead center position of the piston assigned to the respective combustion chamber.

6. An injection valve for the injection of fuel into a combustion chamber of an internal combustion engine, said injection valve including a valve housing, a valve tappet supported in said valve housing so as to be movable outwardly for opening said injection valve, said tappet having a front end with at least two rows of fuel injection ports distributed over the circumference and arranged in clusters in an axial direction, each cluster of ports including at least two pilot fuel injection ports and a main fuel injection port, said main fuel injection port being situated behind the pilot injection ports in the opening direction of said tappet such that the pilot injection ports are opened by a first axial displacement of said valve tappet and the main injection ports are opened during full load or almost full load operation by a further axial displacement of said valve tappet and said pilot injection ports are inclined at different angles to the longitudinal axis of said injection valve.

7. An injection valve according to claim 6, wherein said valve tappet is adjustable in the opening direction by a first distance for the injection of fuel through the pilot injection ports, is movable opposite to the opening direction for providing injection pauses during the pilot injection phase and between the pilot injection phase and the main injection phase, and then again displaceable in the opening direction for the main fuel injection.

8. An injection valve according to claim 7, wherein a piezo-ceramic actuating device is provided for actuating said valve tappet.

9. An injection valve according to claim 6, wherein the injection ports are oriented such that the fuel injection direction of each main injection port is between two pilot injection jets produced by the associated pilot injection ports in order to form a common main jet.

10. An injection valve according to claim 6, wherein two rows of pilot injection ports disposed one above the other are provided, at least one pilot injection port in an upper and a lower row, respectively, being assigned to a main injection port, which is situated behind the pilot injection ports in the opening direction of the valve tappet.

11. An injection valve according to claim 6, wherein the size ratios of the diameters of the larger main injection port to those of the smaller pilot injection ports is between 2:1 and 6:1.

* * * * *